(12) United States Patent
Erdogan et al.

(10) Patent No.: US 10,579,634 B2
(45) Date of Patent: Mar. 3, 2020

(54) APPARATUS AND METHOD FOR OPERATING A DISTRIBUTED DATABASE WITH FOREIGN TABLES

(75) Inventors: Ozgun Ali Erdogan, Istanbul (TR); Sumedh Suhas Pathak, Istanbul (TR); Hadi Moshayedi, Istanbul (TR)

(73) Assignee: CITUS DATA BILGI ISLEMLERI TICARET A.S., Istanbul (TR)

( * ) Notice: Subject to any disclaimer, the term of this patent is extended or adjusted under 35 U.S.C. 154(b) by 600 days.

(21) Appl. No.: 13/600,126

(22) Filed: Aug. 30, 2012

(65) Prior Publication Data

US 2014/0067792 A1  Mar. 6, 2014

(51) Int. Cl.
  *G06F 16/2458* (2019.01)
  *G06F 16/27* (2019.01)
  *G06F 16/25* (2019.01)

(52) U.S. Cl.
  CPC ........ *G06F 16/2471* (2019.01); *G06F 16/256* (2019.01); *G06F 16/27* (2019.01)

(58) Field of Classification Search
  CPC ......... G06F 17/30864; G06F 17/30867; G06F 16/2471
  USPC ........................................................ 707/705
  See application file for complete search history.

(56) References Cited

U.S. PATENT DOCUMENTS

| | | |
|---|---|---|
| 5,600,831 A | 2/1997 | Levy et al. |
| 5,826,258 A | 10/1998 | Gupta et al. |
| 5,913,214 A | 6/1999 | Madnik et al. |
| 7,647,590 B2 * | 1/2010 | Archer et al. ................ 718/100 |
| 7,984,043 B1 * | 7/2011 | Waas ................ G06F 17/30932 707/718 |
| 2002/0083118 A1 * | 6/2002 | Sim ........................ H04L 47/125 718/105 |
| 2005/0055385 A1 | 3/2005 | Sinha et al. |
| 2006/0242102 A1 * | 10/2006 | Bruno .................... G06F 16/22 |

(Continued)

FOREIGN PATENT DOCUMENTS

| | | |
|---|---|---|
| JP | 10-236216 | 12/1998 |
| WO | 2006/096939 A1 | 9/2006 |

OTHER PUBLICATIONS

International Search Report and Written Opinion cited to International Patent Application PCT/US13/56615, dated Mar. 6, 2014, 10 pgs.

(Continued)

*Primary Examiner* — Jensen Hu
(74) *Attorney, Agent, or Firm* — Wokrman Nydegger (57) ABSTRACT

A system includes a coordinator node and worker nodes in communication with the coordinator node. Each worker node stores data blocks. Each data block has data in a semi-structured format and each data block has an associated foreign table declaration specifying conversion of the data in the semi-structured format into a tabular format interpretable by a query language. A query processor executed by the coordinator node produces a distributed query plan in response to a query language query. The distributed query plan includes sub-queries. The sub-queries are executed by selected worker nodes of the worker nodes. The selected worker nodes use foreign table declarations to convert data in semi-structured formats into tabular formats of a distributed database to provide tabular data in response to the query language query.

33 Claims, 5 Drawing Sheets

(56) References Cited

U.S. PATENT DOCUMENTS

| | | | |
|---|---|---|---|
| 2010/0070500 A1* | 3/2010 | Cui | G06F 17/30914 707/736 |
| 2011/0196836 A1 | 8/2011 | Kesselman | |
| 2011/0228668 A1* | 9/2011 | Pillai et al. | 370/217 |
| 2011/0258178 A1 | 10/2011 | Eidson et al. | |
| 2011/0302151 A1* | 12/2011 | Abadi | G06F 16/2456 707/714 |
| 2011/0302583 A1* | 12/2011 | Abadi et al. | 718/102 |
| 2011/0307470 A1 | 12/2011 | Kamimura et al. | |
| 2013/0262425 A1* | 10/2013 | Shamlin | G06F 16/256 707/703 |
| 2013/0262556 A1* | 10/2013 | Xu | G06F 9/5027 709/202 |

OTHER PUBLICATIONS

Kossman, The State of the Art in Distributed Query Processing, ACM Computing Surveys, ACM, New York, NY, vol. 32, No. 4, Dec. 1, 2000, pp. 422-469.

Ozsu et al., "Principles of Distributed Database Systems—Chapter 9—Multidatabase Query Processing", Principles of Distributed Database Systems, Third Edition, Springer New York, New York, NY, Mar. 2, 2011, pp. 318-355.

Yang et al., "Osprey: Implementing MapReduce-style Fault Tolerance in a Shared-Nothing Distributed Database", Data Engineering (ICDE), 2010 IEEE 26th International Conference on, IEEE, Piscataway, NJ, USA, Mar. 1, 2010, pp. 657-668.

Abouzeid et al., "HadoopDB: An Architectural Hybrid of MapReduce and Dbms Technologies for Analytical Workloads", Proceedings of VLDB '09, Aug. 24, 2009, 12 pgs.

Anonymous, "PostgreSQL: Documentation: 9.1: Create Foreign Table", Jun. 17, 2012, 2 pgs., http://wayback.archive.org/web/20120617192224/http://www.postgresql.org/docs/9.1/static/sql-createforeigntable.html.

Josifovski et al., "Garlic: A New Flavor of Federated Query Processing for DB2", Proceedings of the ACM Sigmod International Conference on Management of Data, Jun. 3-6, 2002, Madison, Associate for Computing Machinery, New York, NY, Jun. 4, 2002, pp. 524-532.

Melton et al., "SQL/MED—A Status Report Guest Column Introduction", Sigmod Record., vol. 31, No. 3, Sep. 1, 2002, pp. 81-89.

Extended European Search Report issued to European patent application No. EP 13833537, dated May 9, 2016, 8 pgs.

* cited by examiner

APPARATUS AND METHOD FOR OPERATING A DISTRIBUTED DATABASE WITH FOREIGN TABLES

FIELD OF THE INVENTION

This invention relates generally to software based data storage and retrieval. More particularly, this invention relates to techniques for operating a distributed database with foreign tables.

BACKGROUND OF THE INVENTION

A distributed database is a database in which partitions of data are distributed across discrete computational resources. The distributed database may be implemented in multiple computers located in the same physical location, or may be dispersed over a network of interconnected computers. A distributed database can reside on network servers on the Internet, on corporate intranets or extranets, or on other networks.

Databases require users to model and load data before the data can be queried. This changed somewhat with PostgreSQL, which recently introduced the notion of foreign tables. With this change, users can now define an extension to read data from a semi-structured foreign data source. The on-line encyclopedia Wikipedia characterizes semi-structured data as a form of structured data that does not conform to the formal structure of data models associated with relational databases or other forms of data tables, but nonetheless contains tags or other markers to separate semantic elements and enforce hierarchies of records and fields within the data. (See, http://en.wikipedia.org/wiki/Semi-structured_data).

Foreign table extensions transform semi-structured data into a tabular format, which can then be queried using a standard query language, such as Structured Query Language (SQL). The following general code format may be used to create a foreign table:

```
CREATE FOREIGN TABLE [ IF NOT EXISTS ] table_name ( [
    {column_name data_type [ NULL | NOT NULL ] }
        [, ... ]
[ )
SERVER server_name
[OPTIONS (option 'value' [, ... ] ) ]
```

This code uses the following parameters. "IF NOT EXISTS" specifies not to throw an error if a relation with the same name already exists. "table_name" is the name of the table created. "column_name" is the name of the column to be created in the new table. "data_type" is the data type of the column. "NOT NULL" indicates that the column is not allowed to contain null values. "NULL" indicates that the column is allowed to contain null values. "server_name" is the name of an existing server for the foreign table. "OPTIONS (option 'value' [, . . . ])" specifies options to be associated with the new foreign table. The allowed option names and values are specific to the foreign data wrapper that is associated with the foreign table. These options are validated using the foreign data wrapper's validator function.

The following foreign table declaration instantiates a table called "music":

```
CREATE FOREIGN TABLE music [
    code         char (5) NOT NULL,
    title        varchar (40) NOT NULL,
    did          integer NOT NULL,
    date_prod    date,
    kind         varchar (10),
    len          interval hour to minute
)
SERVER music_server
OPTIONS (format 'text', filename '/home/user/music.txt', delimiter ':',
null '');
```

This table creation command simply stores a foreign table's metadata in the database, where these metadata include the column names, column types, and column options. This particular command also associates a text file on disk with the newly created foreign table, and specifies the options needed to parse the data in this text file.

Once the music table is instantiated, the text file's contents can be queried without actually loading data into the database. Rather, the data persistently remains in its semi-structured format. The foreign table is merely instantiated to support SQL queries.

Thus, one can define an extension for Apache log files, write an extension to parse the log files at query-time, and can run queries on the data. Users can also write extensions to access data on the Internet or other databases.

The problem is that users can only associate one foreign data source with one table. So if the user receives 24 (hourly) Apache log files per day, then the user needs to create 24 foreign tables. Thus, query processing becomes difficult. Further, dozens of web servers may be generating Apache log files in parallel; and processing these log files typically requires resources that extend beyond the capabilities of a single database server.

In view of the foregoing, it would be desirable to provide efficient techniques for operating a distributed database with foreign tables. More particularly, it would be desirable to provide techniques for query language queries of semi-structured data in a distributed database.

SUMMARY OF THE INVENTION

A system includes a coordinator node and worker nodes in communication with the coordinator node. Each worker node stores data blocks. Each data block has data in a semi-structured format and each data block has an associated foreign table declaration specifying conversion of the data in the semi-structured format into a tabular format interpretable by a query language. A query processor executed by the coordinator node produces a distributed query plan in response to a query language query. The distributed query plan includes sub-queries. The sub-queries are executed by selected worker nodes of the worker nodes. The selected worker nodes use foreign table declarations to convert data in semi-structured formats into tabular formats of a distributed database to provide tabular data in response to the query language query.

A computer implemented method includes storing data blocks on networked worker nodes. The data blocks have data in semi-structured formats. The data blocks are associated with foreign table declarations specifying conversions of the data in the semi-structured formats into tabular formats interpretable by a query language. A distributed query plan is produced in response to a query language query. The distributed query plan includes sub-queries. The sub-queries are directed to selected worker nodes of the networked worker nodes. The sub-queries are executed at the selected worker nodes. The execution includes using the foreign table declarations to convert data in semi-structured formats into tabular formats to produce tabular data responsive to the query language query. The tabular data is merged to produce a query result.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
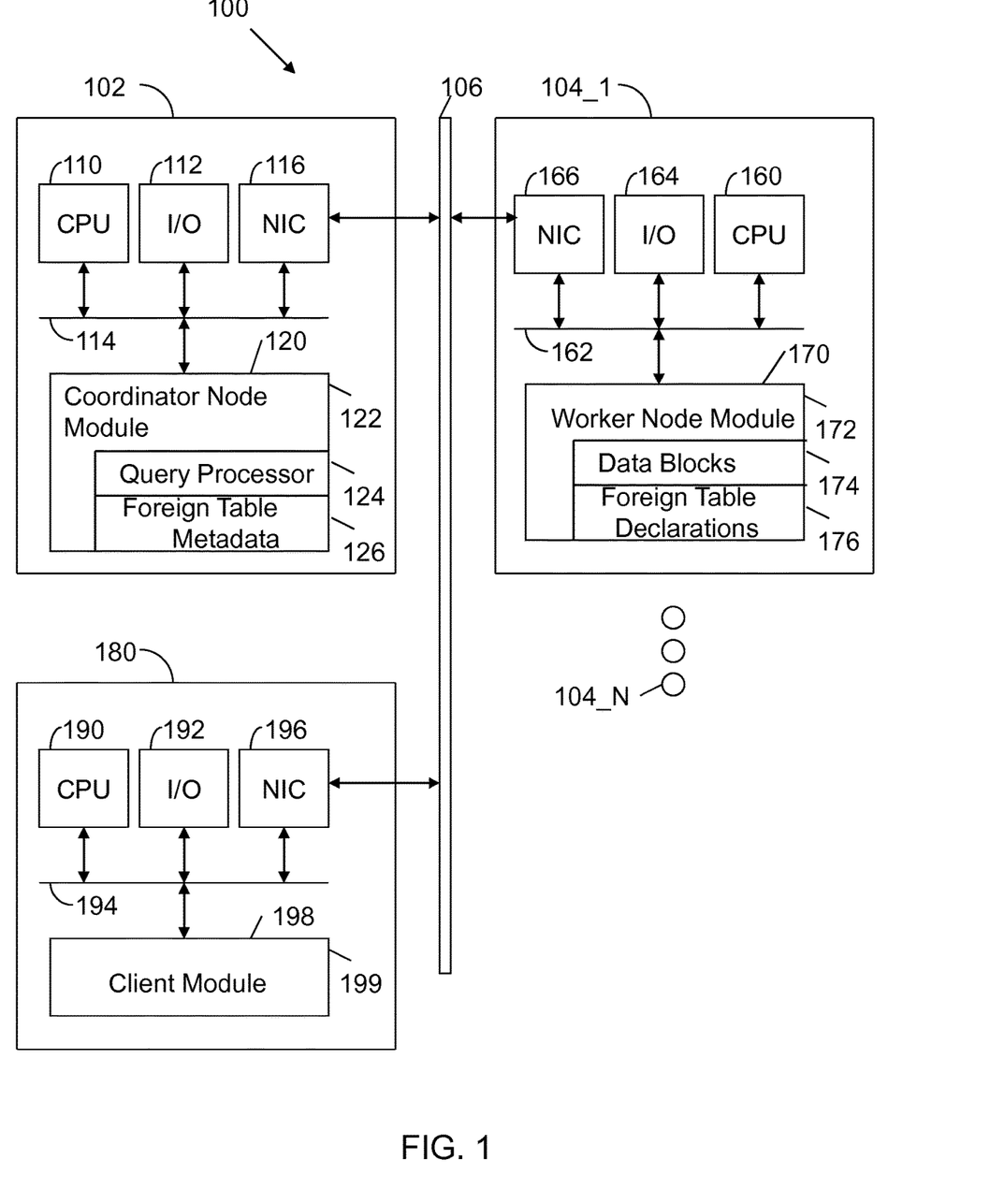
FIG. 1 illustrates a system configured in accordance with an embodiment of the invention.

FIG. 1 illustrates a system 100 configured in accordance with an embodiment of the invention. The system 100 includes a coordinator node 102 and a set of worker nodes 104_1 through 104_N that implement a distributed database. The coordinator node 102 may be a master node or may be attached to a master node (not shown). A wired or wireless network connection 106 links the coordinator node 102 and the worker nodes 104.

The coordinator node 102 includes standard components, such as a central processing unit 110 connected to a set of input/output devices 112 via a bus 114. The input/output devices 112 may include a keyboard, mouse, display, printer and the like. A network interface circuit (NIC) 116 is also connected to the bus 114 and provides access to the worker nodes 104 through network connection 106. A memory 120 is also connected to the bus 114. The memory 120 stores executable instructions to implement disclosed operations. In particular, the memory stores a coordinator node module 122, which includes executable instructions to implement the distributed database operations disclosed below. In one embodiment, the coordinator node module 122 includes a query processor 124 and foreign table metadata 126, as discussed below.

Each worker node 104 also includes standard components, such as a central processing unit 160, a bus 162, input/output devices 164 and a network interface circuit 166. Each worker node computer 104 also includes a memory 170 with executable instructions in the form of a worker node module 172. The worker node module 172 includes executable instructions that are responsive to commands from the coordinator node module 122. Such commands relate to storage, access, replication and duplication of distributed database partitions, as discussed below. Additional commands relate to querying distributed database partitions to derive insights from the data. In one embodiment, the worker node module 172 includes data blocks 174. Some data blocks are semi-structured data, while other data blocks may be structured (i.e., tabular data or database tables). The worker node module 172 also includes foreign table declarations 176. Each foreign table declaration is used to instantiate a foreign table from a semi-structured data block.

The system 100 may also include one or more client computers 180. Each client computer 180 has an associated user of the distributed database. The client computer 180 also includes standard components, such as a central processing unit 190, a bus 194, input/output devices 192 and a network interface circuit 196. Each client computer 180 also includes a memory 198 with executable instructions in the form of a client module 199. The client module 199 may be a browser used to access the distributed database. Alternately, the client module 199 may be a dedicated application for interacting with the distributed database. This dedicated application may communicate with the distributed database through standard protocols such as Structured Query Language (SQL), Open Database Connectivity (ODBC) and Java-based Database Connectivity (JDBC). Finally, the client module 199 may be executed on worker nodes 104 to reduce the cost of data transfers during data upload operations.

Although system 100 includes many attributes associated with known distributed database configurations, the system 100 fundamentally departs from prior art distributed database configurations through its conceptualization of modular data blocks. Each modular data block holds a segment of data associated with the distributed database. The coordinator node 102 defines the modular data blocks and manages their distribution to various worker nodes 104. Each modular data block has a size of 5 Gigabytes or less. This stands in contrast to prior art distributed databases, which partition the data into worker nodes and therefore do not impose a hard limit on the database partition size. As a result, prior art systems have distributed database partitions that range in size from around 100 Gigabytes to around 10,000 Gigabytes. Further, in the prior art, a single worker node holds a single partition of data from the distributed database. In contrast, with the present invention, each worker node 104 holds 25 or more modular data blocks of partitioned data.

A partition is a division of a logical database into distinct independent parts. Each partition may be spread over multiple nodes. Users at a local node can perform local transactions on the partition. The disclosed modular data block is a partition, but the term modular data block is used to emphasize the size distinction compared to prior art implementations of distributed databases. This configuration has advantages in the event of a resource failure and when resources are added to the system. These advantages are set forth in the following commonly owned patent applications: Ser. Nos. 13/345,620; 13/345,621; 13/345,625; and 13/345,626, each of which was filed on Jan. 6, 2012 and each of which is incorporated herein by reference.

In accordance with an embodiment of the invention, a user is allowed to define a distributed foreign table, where a modular data block corresponds to one foreign data source in PostgreSQL. Users then run their typical SQL queries, the database partitions these queries into smaller ones, pushes these smaller queries to the worker nodes, runs them on foreign data sources, and merges the results. The database also applies optimizations such as min/max partition pruning, join pruning, join order selection, and so forth.

Thus, an embodiment of the invention models foreign data sources as individual partitions (or data blocks). Metadata that relates to a partition is maintained on one of the nodes (e.g., the coordinator node or a master node). Query language queries are divided into smaller queries that each run on a foreign data source.

The primary advantage of this embodiment is the clean separation between distributed and local query planning and execution. First, the distributed query processor considers alternate query plans for a query, and compares the network input/output (I/O) costs associated with different plans. For example, if the query joins four tables, the query planner considers six combinations of join orders, determines the network I/O cost for each join order, and constructs the most efficient query plan. The distributed query processor then determines the query execution plan, partitions the query into smaller sub-queries, and directs the sub-queries to the worker nodes. Since the sub-queries themselves may be typical SQL queries, the worker nodes can then locally plan and execute these sub-queries. At this stage, the worker nodes can take into account data block indexes and statistics, plan sub-queries according to their disk I/O costs, and execute them efficiently.

Additionally, in one embodiment, the system imposes the constraint that a foreign data source is local to a worker node. That is, a sub-query is only sent to a worker node if the foreign data source already exists on that node. Consequently, the sub-query directly reads the underlying data from the local disk, and doesn't require any data to be shuffled across the network.

Advantageously, users don't need to model or parse their structured or semi-structured data before loading it into the database. They simply need to write an extension to parse their data. Thus, the entire dataset becomes immediately accessible through a query language, such as SQL.

Figure 2:
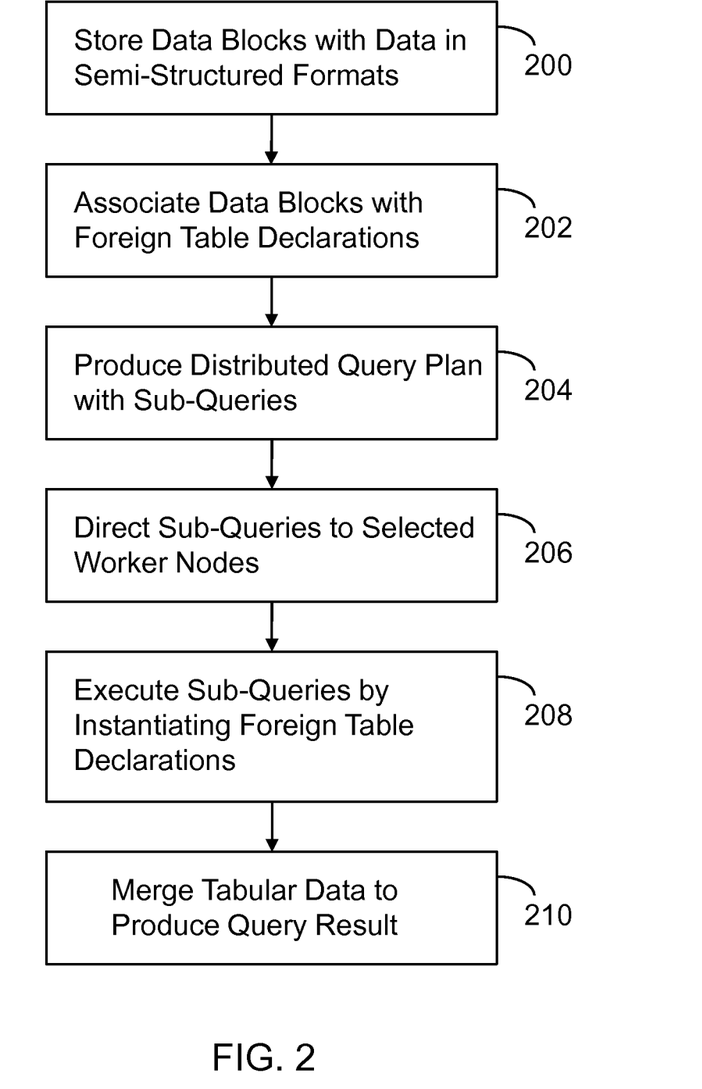
FIG. 2 illustrates processing operations associated with an embodiment of the invention.

FIG. 2 illustrates processing operations associated with an embodiment of the invention. Data blocks with data in semi-structured formats are stored 200. The data blocks are stored on worker nodes 104. Data blocks in a structured format may also form a portion of the distributed database. For data blocks with data in semi-structured formats, associations are made with foreign table declarations 202. For example, a foreign table declaration of the type discussed above maybe used.

A distributed query plan with sub-queries is then produced 204. That is, a received query is processed to form a query plan with sub-queries that are executed on different worker nodes 104. In certain cases, for example with sub-queries that involve table joins, data blocks may need to be moved or repartitioned across the worker nodes 104 to efficiently execute the distributed query plan. As an example, for a distributed query plan that joins one large and one small table, the small table's data blocks may be replicated across all worker nodes 104 prior to executing sub-queries. Similarly, if the distributed query plan involves joins between two large tables, the sub-queries themselves may incorporate distributed execution primitives to repartition block data on a different table dimension (table column).

Once sub-queries are planned, they are then directed toward selected worker nodes 206. The sub-queries are then executed by relying on foreign table declarations 208. For example, a first sub-query is sent to a first worker node, which uses a first foreign table declaration to read the data from a first semi-structured data block, convert the data to the first table's tabular format, and execute the first sub-query on the first table's tabular data. At the same time, a second sub-query is sent to a second worker node, which uses a second foreign table declaration to read and convert the data from a second semi-structured data block, and execute the second sub-query.

Tabular data from the sub-query results are then merged to produce a query result 210. The query processor 124 of the coordinator node 102 may implement this operation.

Figure 3:
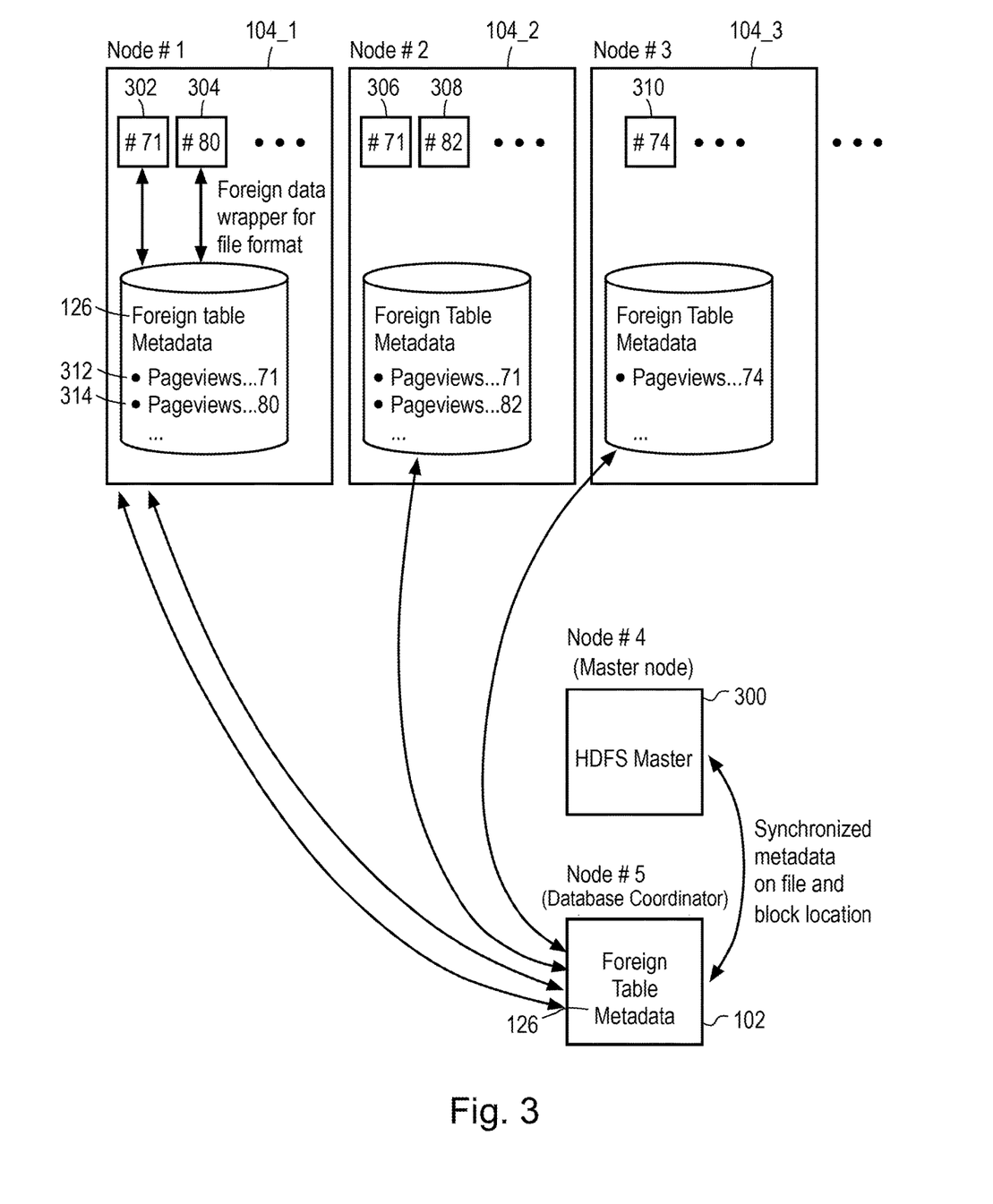
FIG. 3 illustrates foreign table metadata synchronization operations performed in accordance with an embodiment of the invention.

FIG. 3 illustrates a Hadoop File System (HDFS) cluster that also has foreign table declarations and a coordinator node. In this example, master node 300 is an HDFS master that controls the allocation of blocks across worker nodes, keeps metadata about block locations, and helps execute Hadoop jobs on these data blocks. The worker nodes 104_1, 104_2 and 104_3 store these data blocks and also execute Hadoop tasks on these blocks. However, these tasks need to be written in a programming language and should follow the parallel programming paradigm MapReduce®.

To make analytics easier, data can be analyzed using a query language. Query languages are typically designed for tuple calculus however, and hence the semi-structured data needs to be represented in a tabular format. For this representation, foreign table declarations and wrappers are used. For example, worker node 104_1 has data blocks 302 and 304. In the case of a data block with semi-structured data, there is an associated foreign table declaration. Local metadata 126 is maintained on foreign table declarations. In this example, foreign table declaration for block 302 is shown at line 312, while foreign table declaration for block 304 is shown at line 314.

These declarations allow for worker nodes to run sub-queries on individual data blocks. To run a query on the entirety of the system, a coordinator node 102 also needs to know the network locations of the data blocks in the system. This metadata can be synchronized from the master node 300 continuously or at regular intervals, or the coordinator node 102 can poll worker nodes 104_1, 104_2 and 104_3 to reconstruct this information. Once the coordinator node 102 has block metadata, the query processor 124 can then partition a query into sub-queries, and direct these sub-queries to worker nodes. For example, the query processor partitions an example query into two sub-queries that need to run on data blocks 302 and 304, and directs them to worker node 104_1 for execution. The worker node 104_1 then uses foreign table declarations 312 and 314 to run these sub-queries on tabular data, and returns these results through the coordinator node 102.

In this example, block data are already loaded into HDFS as text-only files, and metadata for these blocks are synchronized from the HDFS master node. In another embodiment, the underlying data lives in MongoDB shards or chunks as binary files, and their metadata are synchronized from the MongoDB config servers. In an alternate embodiment, the block data represents regular log files; and these data are not managed by an existing system. The user then creates a foreign table and uploads metadata about these files to the coordinator node. In all three examples, the coordinator node can make the underlying data accessible through a query language as long as the underlying data's format is known and the metadata about block locations are uploaded to the coordinator node.

Figure 4:
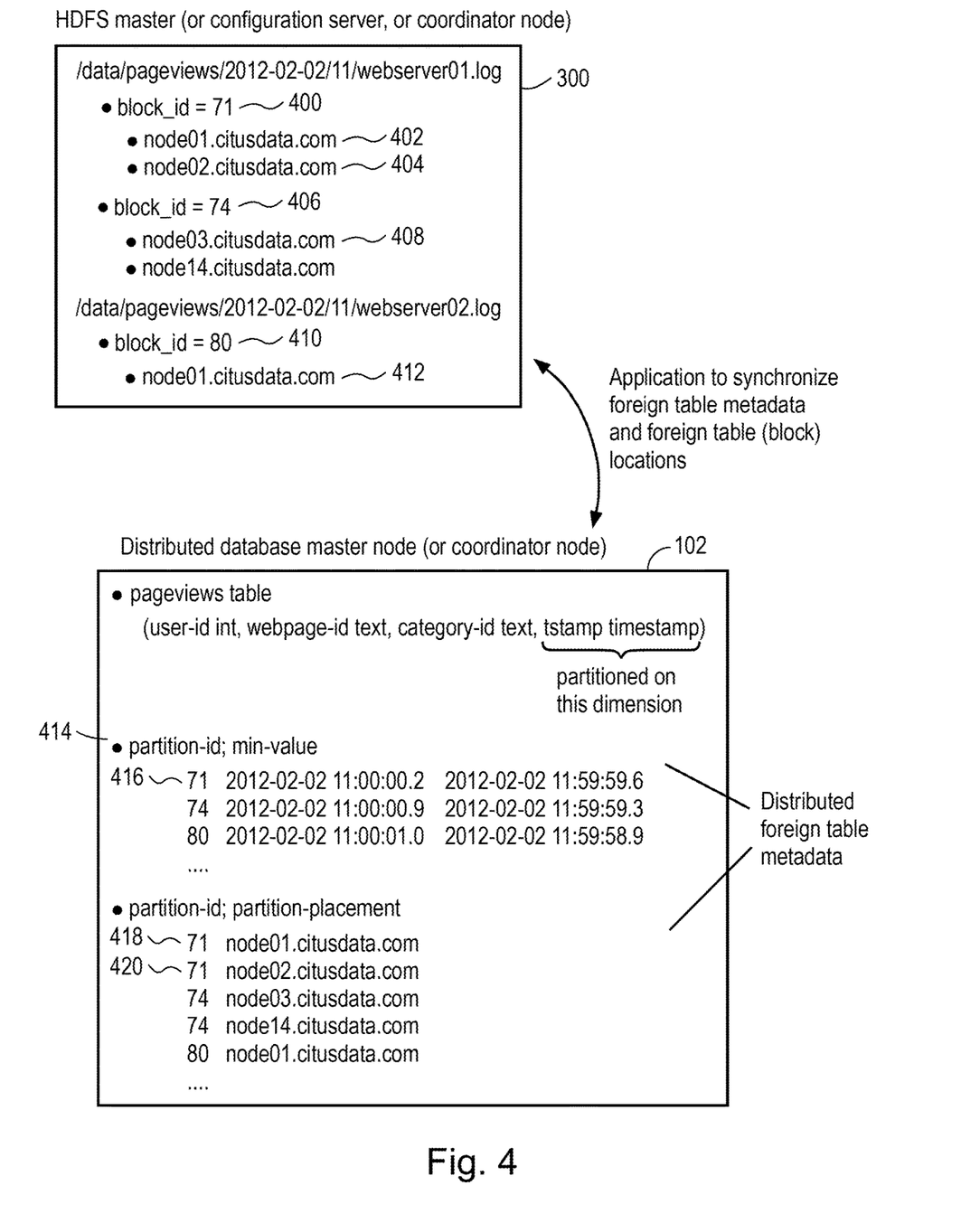
FIG. 4 illustrates the synchronization of foreign table metadata and data block locations in accordance with an embodiment of the invention.

FIG. 4 illustrates one embodiment of metadata associated with master node 300 and coordinator node 102. Master node 300 maintains block identification information 400 and the associated locations 402, 404 for the block. Location 402 corresponds to node 104_1, while location 404 corresponds to node 104_2 of FIG. 3. Block identification 406 corresponds to block 74, with location 408, in this case on node 104_3 of FIG. 3. Block identification 410 corresponds to block 80, with location 412, in this case on node 104_2 of FIG. 3.

The coordinator node 104 may keep various forms of metadata. For example, line 414 illustrates partition identification by minimum and maximum timestamp values. Line 416 illustrates block 71 of FIG. 3 with a set of associated minimum and maximum timestamp values. These timestamp values may be manually specified by the user, may be fetched from an external source, or may automatically be collected by the coordinator node 104 by querying the block data. Other metadata in FIG. 4 relates to the location of the partitions. For example line 418 indicates that block 71 is on node 1 (104_1 of FIG. 3) and line 420 indicates that block 71 is also on node 2 (104_2 of FIG. 3).

Figure 5:
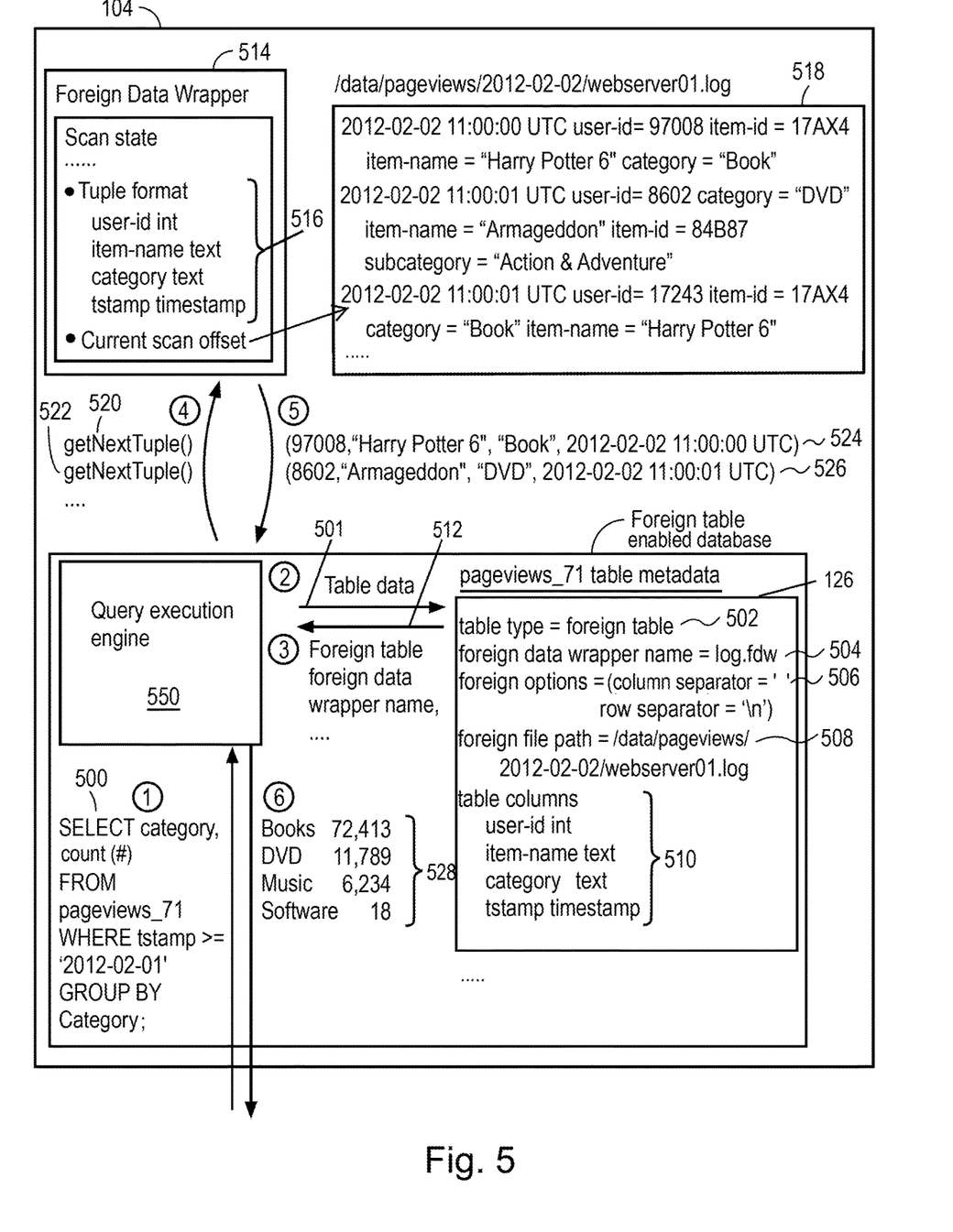
FIG. 5 illustrates an example of query execution in accordance with an embodiment of the invention.

FIG. 5 illustrates processing performed by a worker node 104. The worker node 104 includes a local query processor 550, which receives a SQL sub-query 500 for a local table that corresponds to block 71. In this example, the SQL sub-query requests web page views after a specified date, as grouped by category. The local query processor 550 accesses the local foreign table metadata 126, as shown with arrow 501. In this example, the local foreign table metadata 126 includes an entry 502 specifying that the table type is a foreign table. The associated foreign table declaration is specified at line 504. Foreign table options are specified at line 506. The foreign table location is defined at line 508. In this case, the file path specifies a page views web server log. Entries 510 define the structure of the foreign table. Relevant metadata is then returned to the local query processor 550, as shown with arrow 512.

The local query processor 550 produces an optimal plan for the sub-query using the foreign table declaration and foreign data wrapper 514. The foreign data wrapper 514 converts the semi-structured data within the web server log 518 into the tabular format 516. The tabular formats provide tabular data in response to the sub-query. In this example, the local query processor 550 chooses a sequential table scan to iterate over the web server log's data, and asks for the next tuples with function calls 520 and 522. The foreign data wrapper 514 then returns the tuples 524 and 526. The local query processor 550 merges the tabular data, applies its filtering and grouping operations, and provides a sub-query result 528.

Observe that the data 518 is processed at node 104 in its original format. The data 518 does not have to be consolidated and then be subsequently processed at a coordinator node. Further observe that the data 518 is processed using SQL, not a translation of SQL into JAVA or some other language.

This approach of partitioning a query into smaller SQL sub-queries, as opposed to executing the query using a parallel programming paradigm such as MapReduce®, has three distinct advantages. First, paradigms such as MapReduce® abstract away data block locations from the higher-level query processor. As a result, a query that joins four tables generates three MapReduce® join jobs, whereas a query processor that knows block locations may execute the query in a single step.

A second advantage of using SQL in sub-queries is the rich set of user-defined functions already available in the language. In contrast, translating queries into MapReduce® jobs may also necessitate implementing functions for math operations, string manipulations, date and time formatting, pattern matching, and so forth.

Finally, SQL sub-queries bring notable performance advantages at the worker node level. The foreign data wrappers at these worker nodes can make use of data block indexes, let the database know of alternate query plans and plan costs for walking over the data, and can also collect statistics about the underlying data. This notably minimizes the disk I/O required to execute SQL sub-queries. In contrast, the MapReduce® programming paradigm is primarily designed to always sequentially walk over the entire data set.

As a result of all these advantages SQL brings, one possibility involves converting the data from its semi-structured format, and regularly loading it from a MapReduce® based system into a distributed database system. In comparison, the disclosed method's use of native semi-structured data and associated foreign table declarations avoids the loading of data into database tables and the associated expense of data duplication and data shuffling across a network. Further, the disclosed approach more easily adapts to the changes in the underlying data. For example, when a new field is added to the semi-structured data, directly loading it into the database requires the conversion script to emit this new field's value to intermediate files. In contrast, foreign data wrappers can immediately pick up the new field from the underlying data once the user alters the foreign table's schema to include this field.

Thus, the disclosed technique uses foreign tables to allow one to use a query language to access semi-structured data. Advantageously, one does not need to export data from one system and import it into another system. For example, in one embodiment, MongoDB may be used for real-time updates, while Hadoop is used for batch analytic jobs. Utilizing current techniques, the combination of MongoDB and Hadoop for the same data set requires expensive options. One option is to duplicate the data from MongoDB to Hadoop in a format that Hadoop jobs can understand. Another option is to implement Hadoop's execution primitives in MongoDB. The first option requires the movement of terabytes of data, while the second option requires programmers to implement a lot of code on MongoDB.

In contrast, with the disclosed technology, one simply needs to write a foreign data wrapper to convert the data from the format that one system understands to a format that another system understands. The foreign data wrapper is accompanied by metadata that is synchronized between the two systems. The metadata includes block locations across the network so that the second system can access data as if the data were its own. Further, the execution primitives used by the second system need to be accessible on the worker nodes if computations are to be pushed to the distributed data.

An embodiment of the invention includes an application that fetches block metadata from other data stores and uploads the metadata to the coordinator node and/or a master node. Subsequently, one can run SQL queries on semi-structured data. Techniques of the invention may also be used with text-only files.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system, comprising:
a coordinator node;
a plurality of worker nodes in communication with the coordinator node, wherein each worker node stores a plurality of data blocks, wherein each data block has data in a same semi-structured format, each data block is a partition of a same distributed database, each data block has a same foreign table declaration, and the foreign table declaration includes command(s) for converting the data in the semi-structured format into converted data in a tabular format; and
a query processor executed by the coordinator node to produce a distributed query plan in response to a query in a structured query language,
wherein the distributed query plan is partitioned into a plurality of sub-queries, each of which corresponds to a particular data block;
wherein for each sub-query corresponding to the particular data block;
a worker node is selected, the selected worker node contains the corresponding particular data block;
the corresponding sub-query is executed by the selected corresponding worker node of the plurality of worker nodes;
the selected worker node uses a local version of the same foreign table declaration to convert data of the particular data block in the same semi-structured format into converted data in the tabular format; and
the selected worker node executes the sub-query on the converted data to generate a sub-query result;
wherein each sub-query result is merged to produce a query result.

2. The system of claim 1 wherein the coordinator node mergers the tabular data from the selected worker nodes to provide a query result.

3. The system of claim 1 wherein the query processor directs each sub query to a worker node that contains the related data block.

4. The system of claim 1 wherein the coordinator node maintains foreign table metadata, wherein the foreign table metadata characterizes the tabular format.

5. The system of claim 4 wherein the query processor accesses the foreign table metadata to develop the distributed query plan.

6. The system of claim 1 wherein the coordinator node maintains metadata on the data blocks, wherein the metadata includes the location of the data blocks across the plurality of worker nodes.

7. The system of claim 6 wherein the query processor accesses the metadata on the data blocks to develop the distributed query plan.

8. The system of claim 1 wherein the query processor evaluates alternate network input/output costs to develop the distributed query plan.

9. The system of claim 1 wherein the query processor evaluates statistics on the data blocks to develop the distributed query plan.

10. The system of claim 1 wherein the query processor issues commands to copy one or more data blocks between the plurality of worker nodes to execute the distributed query plan.

11. The system of claim 1 wherein the query processor repartitions the data in the data blocks to execute the distributed query plan.

12. The system of claim 1 wherein a data block is replicated across the plurality of worker nodes.

13. The system of claim 1 wherein a data block is stored as a text file.

14. The system of claim 1 wherein a data block is stored as a binary file.

15. The system of claim 1 wherein the selected worker nodes evaluate statistics on the data blocks to develop a sub-query plan.

16. The system of claim 1 wherein the selected worker nodes evaluate data block indexes to develop a sub-query plan.

17. The system of claim 1 wherein the query language sub-query is a Structured Query Language (SQL) query.

18. A computer implemented method, comprising:
storing a plurality of data blocks on each of a plurality of networked worker nodes, wherein the data blocks have a same semi-structured format and each data block is a partition of a same distributed database;
associating each data block with the same foreign table declaration specifying conversion of the same semi-structured format into converted data in a tabular format;
producing a distributed query plan in response to a query in a structured query language, wherein the distributed query plan is partitioned into a plurality of sub-queries, each of which corresponds to a particular data block;
wherein for each of the sub-queries corresponding to the particular data block;
selecting a worker node from the plurality of networked worker nodes, the selected worker node containing the corresponding particular data block;
executing the corresponding sub-query at the selected worker node, wherein executing includes using instances of the foreign table declaration to convert data of the particular data block in the semi-structured format into converted data in the tabular format; and the selected worker node executes the sub-query on the converted data to generate a sub-query result; and
merging each sub-query result to produce a query result.

19. The computer implemented method of claim 18 further comprising directing each sub-query to a worker node that contains the related data block.

20. The computer implemented method of claim 18 further comprising generating foreign table metadata, wherein the foreign table metadata characterizes the tabular formats.

21. The computer implemented method of claim 20 further comprising accessing the foreign table metadata to develop the distributed query plan.

22. The computer implemented method of claim 18 further comprising generating metadata on the data blocks, wherein the metadata includes the location of the data blocks across the networked worker nodes.

23. The computer implemented method of claim 22 further comprising accessing the metadata on the data blocks to develop the distributed query plan.

24. The computer implemented method of claim 18 further comprising evaluating alternate network input/output costs to develop the distributed query plan.

25. The computer implemented method of claim 18 further comprising evaluating statistics on the data blocks to develop the distributed query plan.

26. The computer implemented method of claim 18 further comprising issuing commands to copy one or more data blocks to execute the distributed query plan.

27. The computer implemented method of claim 18 further comprising repartitioning the data in data blocks to execute the distributed query plan.

28. The computer implemented method of claim 18 wherein a data block is replicated across the networked worker nodes.

29. The computer implemented method of claim 18 further comprising storing a data block as a text file.

30. The computer implemented method of claim 18 further comprising storing a data block as a binary file.

31. The computer implemented method of claim 18 further comprising evaluating statistics on the data blocks to develop a sub-query plan.

32. The computer implemented method of claim 18 further comprising evaluating data block indexes to develop a sub-query plan.

33. The computer implemented method of claim 18 wherein the query language sub-query is a Structured Query Language (SQL) query.

* * * * *